(12) United States Patent
Lichtenau et al.

(10) Patent No.: US 10,901,745 B2
(45) Date of Patent: Jan. 26, 2021

(54) METHOD AND APPARATUS FOR PROCESSING STORAGE INSTRUCTIONS

(71) Applicant: International Business Machines Corporation, Armonk, NY (US)

(72) Inventors: Cedric Lichtenau, Stuttgart (DE); Peter Altevogt, Ettlingen (DE); Thomas Pflueger, Leinfelden (DE)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 16/031,155

(22) Filed: Jul. 10, 2018

(65) Prior Publication Data

US 2020/0019407 A1 Jan. 16, 2020

(51) Int. Cl.
*G06F 9/38* (2018.01)
*G06F 9/30* (2018.01)

(52) U.S. Cl.
CPC ........ *G06F 9/3853* (2013.01); *G06F 9/30043* (2013.01); *G06F 9/30098* (2013.01); *G06F 9/3818* (2013.01)

(58) Field of Classification Search
CPC .. G06F 9/30043; G06F 9/3853; G06F 9/3818; G06F 9/30098; G06F 9/30181
See application file for complete search history.

(56) References Cited

U.S. PATENT DOCUMENTS

| | | | |
|---|---|---|---|
| 6,330,657 B1* | 12/2001 | Col | G06F 9/3017 712/23 |
| 9,411,593 B2 | 8/2016 | Jha | |
| 9,595,075 B2 | 3/2017 | Heinrich et al. | |
| 2002/0184460 A1 | 12/2002 | Tremblay et al. | |
| 2003/0033491 A1 | 2/2003 | Henry et al. | |
| 2014/0258667 A1 | 9/2014 | Sudhakar | |
| 2017/0249144 A1 | 8/2017 | Jaget et al. | |
| 2019/0042465 A1 | 2/2019 | Li | |
| 2019/0102197 A1* | 4/2019 | Kumar | G06F 9/3867 |
| 2020/0004550 A1* | 1/2020 | Thakker | G06F 9/3832 |
| 2020/0233665 A1 | 7/2020 | Valentine et al. | |

OTHER PUBLICATIONS

"Compacting Loads and Stores for Code Size Reduction", Isaac Asay, Feb. 2014 (Year: 2014).*
Asay, I., "Compacting Loads and Stores for Code Size Reduction," Thesis in Partial Fulfillment of the Requirements for the Degree of Master of Science in Electrical Engineering, Feb. 2014, 196 pages.
Johnson et al., "Using Multiple Memory Access Instructions for Reducing Code Size," Proceedings CC '04, LNCS Mar. 2004, vol. 2985, pp. 265-280, Springer-Verlag. https://www.cl.cam.ac.uk~am21/papers/cc04.pdf.

* cited by examiner

*Primary Examiner* — Farley Abad
(74) *Attorney, Agent, or Firm* — Jorge R. Maranto

(57) ABSTRACT

A processor unit for processing storage instructions. The processor unit comprises a detection logic unit configured to identify at least two storage instructions for moving addressable words between registers of the processor unit and neighboring storage locations. The processor unit further comprises a combination unit configured to combine the identified instructions into a single combined instruction; and a data movement unit configured to move the words using the combined instruction.

19 Claims, 7 Drawing Sheets

METHOD AND APPARATUS FOR PROCESSING STORAGE INSTRUCTIONS

BACKGROUND

The present disclosure relates to the field of digital computer systems, and more specifically, to a processor unit for processing storage instructions.

The benefit of having objects and classes in modern programming languages is that it eases the task of programming while also creating programs that are portable and flexible. Typically, the use of objects and classes requires compilers to generate code that consists of multiple load and store operations. For example, popping or pushing items on a stack, as well as loading or storing multiple elements of an object. The result of this code creates a high level of strain on the memory subsystem and may limit any potential performance increase due to the bottleneck created by the load and store paths.

SUMMARY

Embodiments of the disclosure are directed to a processor unit and a method for processing storage instructions as described by the subject matter of the independent claims. A processor unit for processing storage instructions, having the features of the described embodiments, comprises a detection logic unit. The detection logic unit is configured to identify at least two storage instructions for moving addressable words to or from registers of the processor unit as well as to or from neighboring storage locations. The processor unit also comprises a combination unit that is configured to combine the identified instructions into a single combined instruction and a data movement unit configured to move the words using the combined instruction.

Also included is a method for processing storage instructions of a received instruction that references a word. The method comprises the step of determining whether an instruction queue comprises a queued instruction, wherein the queued instruction references a second word and neighbors a first word of the received instruction. Upon determining that the instruction queue comprises the queued instruction that references the second word and neighbors the first word of the received instruction, the received instruction is combined with the queued instruction into a combined instruction, wherein the combined instruction moves the first word and the second word. Upon determining that the instruction queue does not comprise the queued instruction referencing the second word and that the queued instruction does not neighbor the first word of the received instruction, the received instruction is queued into the instruction queue.

The above summary is not intended to describe each illustrated embodiment or every implementation of the present disclosure.

BRIEF DESCRIPTION OF THE DRAWINGS

In the following, embodiments of the disclosure are explained in greater detail, by way of example only, making reference to the drawings in which.

Like reference numerals are used to designate like parts in the accompanying drawings.

DETAILED DESCRIPTION

Figure 1:
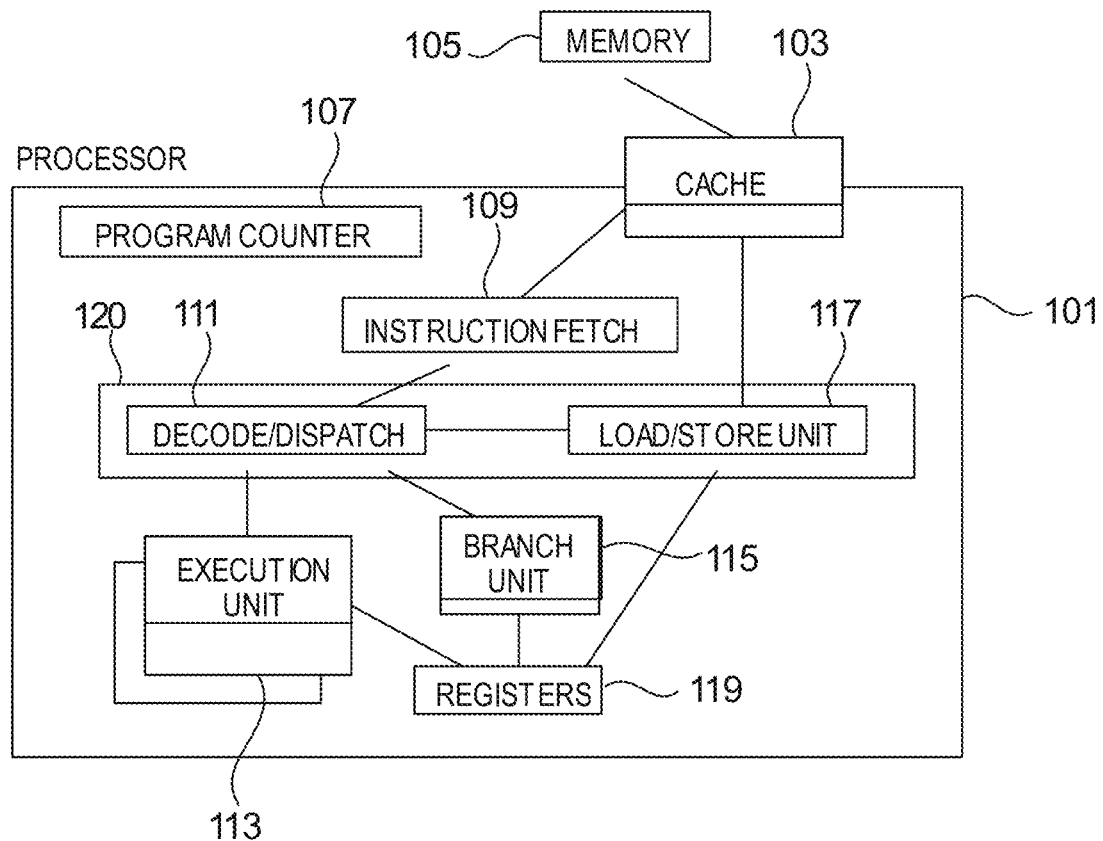
FIG. 1 illustrates a structure of a processor in accordance with the present disclosure.

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

The present disclosure provides a method and apparatus to increase the effective load/store bandwidth of a processor cache. Load instructions that have addresses in the same address range (e.g. in the same processor cache line) may be combined into one cache read access. Two formatter circuits return the appropriate data corresponding to the two load addresses. Similarly, stores with addresses in the same range may be combined with two formatter circuits and stored into the processor cache with a single write access or into a memory structure organized inline. A circuit in the processor pipeline is used to detect loads/stores in the same address range with no intermediate dependencies within a window of instructions. For example, during execution, a circuit may optionally validate whether the address of both loads or stores were correctly predicted to be within the same address range. The circuit may also validate whether no intermediate dependencies were observed if the loads/stores accesses have been speculatively combined based on a pre-identification of the combinable instructions as described herein.

An embodiment of the present disclosure combines spatially close accesses within a window of instructions. This may reduce the number of dispatch and issue slots. The requested bandwidth to a memory subsystem may also be reduced. The cache accesses may be performed in parallel in order to save time and power.

The combination of the instructions may be achieved without increasing the width of data buses because most accesses tend to be less than the full data width (e.g. two accesses with half data width elements are combinable).

Data words are considered spatially close or "neighboring" if they fit within a group of data words accessed at one time by the memory subsystem. For example, one or more cache-lines that may be read at one time before a formatter selects the data to return or if the cache-lines are within a dynamic random-access memory (DRAM) line.

According to one embodiment, the detection logic unit is configured to identify at least two storage instructions in a predefined window of a storage instructions stream that is received by the detection logic unit. The window represents the logical boundary of the number of instructions that can be considered at one time by the detection logic unit. For example, the window may comprise a predefined maximum number of sequential instructions such as 10, inst1 to inst10. As soon as the instruction inst1 is dispatched, the window may comprise inst2-inst11, wherein inst11 is a received instruction after inst10. The window of instructions may also, for example, be stored in a set of flip flops.

In another embodiment, the storage instruction may be an instruction that references memory content that is moving content from the registers into memory or vice versa. For example, the storage instruction may comprise at least one source or target operand that references the content of a memory location. The storage instruction may, for example, be a data movement instruction, such as a load/store instruction, an arithmetic instruction, or a mathematical instruction.

In another embodiment, the window comprises at least four instructions. An advantage of this embodiment is that the higher the number of instructions within the window allows for the possibility of more combined instructions.

According to another embodiment, the processor unit further comprises an instruction queue that stores the fetched instructions that are considered for dispatching storage instructions within the window.

According to another embodiment, the combined instruction comprises individual instructions for each of the words, wherein the data movement unit is configured to move the words by processing the individual instructions in parallel. This may save processing time and power.

According to another embodiment, the identified instructions are load instructions, wherein the data movement unit is configured to move the words into a position that is in accordance with their respective instructions in a received instruction stream. For example, when combining two load instructions, two results are returned with the second value corresponding with a younger instruction, wherein the younger instruction is an instruction located later in the in-order instruction stream. The second value may be saved in a temporary register and applied at the corresponding point in the instruction stream. This allows for seamless integration of the present method into an existing processor system.

According to another embodiment, neighboring storage locations are identified when storage locations are addressed by addresses having a common base register and where the offsets are separated by a predefined maximum distance.

According to another embodiment, the words are within a same cache line of a cache or are within the same data block of a memory.

According to another embodiment, the storage instructions may be load instructions, wherein neighboring locations cannot be referenced by a store instruction that is received between the identified instructions within a received instruction stream. For example, if the stream comprises a sequence of instructions inst1, inst2 and inst3, wherein inst1 and inst3 are combinable load instructions e.g. the instructions have the same base register and refer to neighboring words, and wherein inst2 is a store instruction that refers to the same location as the one of inst3. In this case, combining instructions inst1 and inst3 is unable to be performed because the future combined instruction would be unable to use the updated value of the location of inst3.

According to another embodiment, the processor unit further comprises a cache that stores words in cache lines. The cache comprises each of the combined instructions, a store multiplexer (or data aligner multiplexer), and data selection multiplexer that enables the storage and read of loads, respectively, from one or more cache lines.

According to another embodiment, the data movement unit is a load and store unit, wherein the detection logic unit and the combination unit are part of an instruction decode unit.

According to one embodiment, the detection logic unit and the data movement unit are part of a load and store unit, and the combination unit is part of an instruction decode unit. Once the detection logic detects that two storage instructions can be combined, subsequent execution of that instruction stream will start combining both detected storage instructions.

These embodiments enable multiple configurations that are able to be seamlessly integrated into existing processors, wherein each configuration may be chosen based on the hardware limitations of an existing system.

FIG. 1 is an exemplary structure of a processor 101. For example, one or more levels of cache 103 are employed to buffer memory data to improve processor performance. The cache 103 is a high-speed buffer that holds cache lines of memory data that are likely to be used. Typical cache lines comprise 64, 128 or 256 bytes of memory data. Cache 103 is caching data of higher hierarchical storage of main memory storage 105.

The cache 103 may, for example, store data in cache lines, wherein each cache line comprises words. Each cache line of the cache 103 may store words of a data block within the main memory 105. The cache as shown is a separate component. However, the cache 103 may be part of one or more components within the processor 101. For example, the load and store unit 117 may comprise a cache 103.

A program counter (instruction counter) 107 keeps track of the address of an instruction that is currently being executed. A program counter in a z/Architecture processor is 64 bits but can be truncated to 31 or 24 bits to support prior address limitations. A program counter may typically be embodied in a program status word (PSW) of a computer such that it persists during context switching. Thus, a program that has a program counter value, and is actively running, may be interrupted by, for example, the operating system by context switching from the program environment to the operating system environment. The PSW of the program maintains the program counter value while the program is not active, and the program counter, in the PSW, of the operating system is used while the operating system is actively running Typically, the program counter is incrementally increased by an amount equal to the number of bytes of the current instruction. The program counter 107 is modified by either a context switch operation or by a branch taken operation of a branch instruction. In a context switch operation, the current program counter value is saved in the program status word along with other state information about the program being executed (such as condition codes), and a new program counter value is loaded that points to an instruction of a new program module to be executed. A branch taken operation is performed to permit the program to make decisions or to loop within the program by loading the result of the branch instruction into the program counter 107.

Typically, an instruction fetch unit 109 fetches instructions on behalf of the processor 101. For example, the fetch unit 109 either fetches "next sequential instructions", target instructions of branch taken instructions, or the first instructions of a program that follow a context switch. Examples of instruction fetch units 109 often utilize prefetch techniques to speculatively prefetch instructions based on the likelihood that the prefetched instructions will be used. For example, a fetch unit 109 may fetch 16 bytes of instruction that includes the next sequential instruction as well as additional bytes of further sequential instructions.

Fetched instructions are executed by the processor 101. For example, the fetched instruction(s) are passed to a decode and dispatch unit 111. In one embodiment, the decode and dispatch unit 111 belong to the fetch unit 109. The dispatch unit 111 decodes the instruction(s) and forwards the information about the decoded instruction(s) to an execution unit 113, a branch unit 115, and a load/store unit 117. In another embodiment, the dispatch unit 111 and the load and store unit 117 may belong to a processor unit 120. An execution unit 113 typically receives information about decoded arithmetic instructions from the instruction fetch unit 109 and performs arithmetic operations on operands according to the opcode of the instruction. Preferably, operands are provided to the execution unit 113 either from the memory 105, the vector registers 119, or from an immediate field of the instruction being executed. Results of the execution, when stored, are stored either in the memory 105, the registers 119, or in other machine hardware such as control registers, PSW registers, and the like.

As shown in FIG. 1, registers 119 may be of the same size. For example, each of the registers 119 may store K bits which may correspond to the size of a word. For example, fixed-sized chunks of bytes, known as words, may be transferred from the memory 105 to the register 119. The number of bits in a word may for example be equal or smaller than the size K of the register 119. For example, load/store instructions of the load and store unit 117 provide the ability to take the words stored in the memory 105 and pack them into sequential streams that are placed in the registers 119. For example, the memory 105 may be configured to comprise 256-bit memory blocks. A 256-bit memory block may be partitioned into chunks of K bits. During processing, each K-bit chunk is loaded into a register 119.

Figure 2:
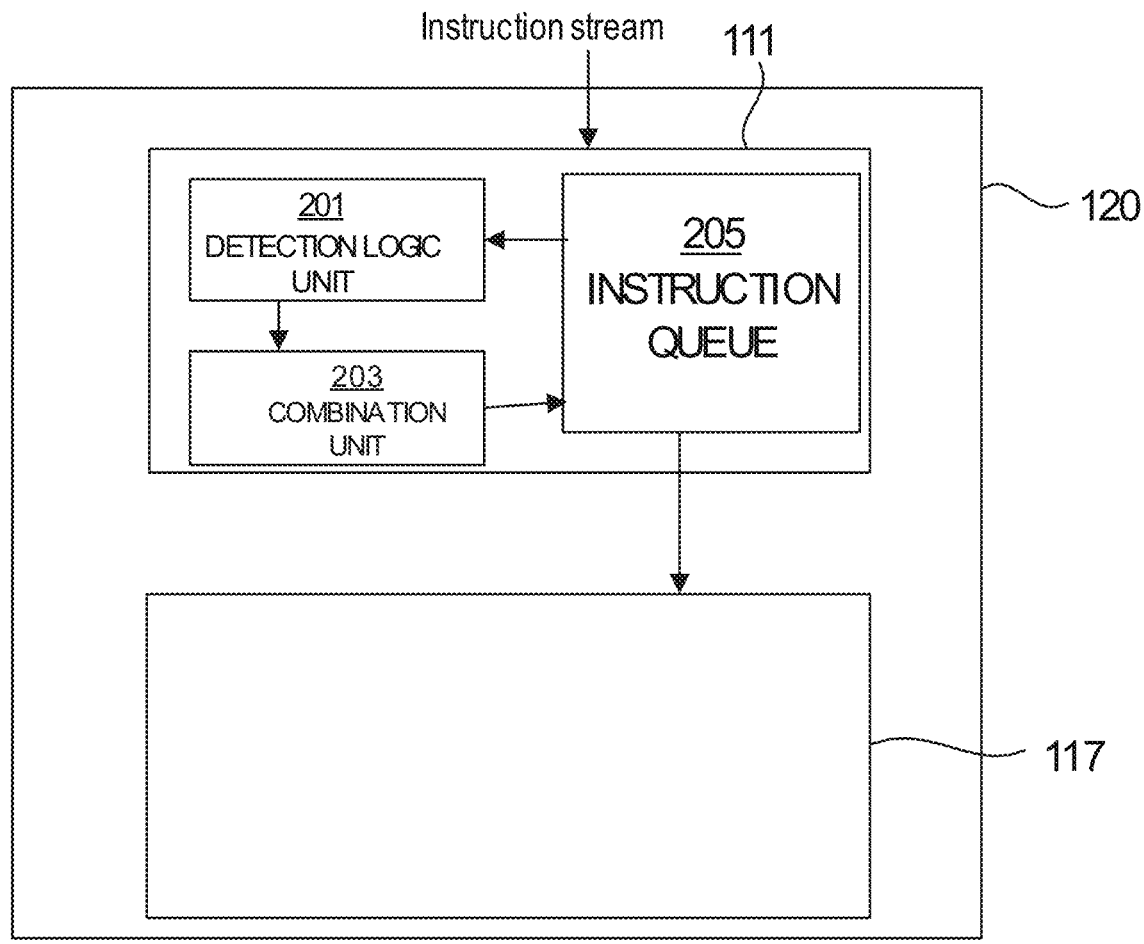
FIG. 2 is a diagram illustrating components of a processing unit in accordance with an example of the present disclosure.

FIG. 2 is a diagram of the processor unit 120 in according to one illustrative embodiment. The decode and dispatch unit 111 is shown as receiving an instruction stream of storage instructions such as data movement instructions from the instruction fetch unit 109. Storage instructions of the received instruction steam may be queued in an instruction queue 205 of the decode and dispatch unit 111 in accordance with the present disclosure.

The decode and dispatch unit 111 comprises a detection logic unit 201. The detection logic unit 201 is configured to identify at least two storage type instructions for moving addressable words to and from the registers 119 of the processor from and to neighboring storage locations or from and to an execution unit. For example, a data movement instruction may comprise an instruction to move a word from the register 119 to the cache 103. In another example, a data movement instruction may be an instruction for moving a word from the cache 103 or memory 105 to the register 119. In one embodiment, the detection logic unit 201 may be configured to access the instruction queue 205. For example, the detection logic unit 201 may be configured to store a received instruction in the instruction queue 205 if it is not combinable with another instruction in the queue 205. The detection logic unit 201 may be configured to identify the instructions of the queue 205 that are able to be combined with a received instruction within the stream.

The decode and dispatch unit 111 further comprises a combination unit 203. The combination unit 203 is configured to combine the identified instructions into one combined request. For example, the combination unit 203 may receive information of the identified instructions from the detection logic unit 201. The combination unit 203 may be configured to combine the identified instructions into one combined instruction or request. The combination unit 203 may replace the identified instructions in the queue with the single instruction. For example, the identified instructions may comprise two instructions, a first instruction that is part of the queue and a second instruction which is the received instruction. The first instruction of the queue is replaced by the combined instruction, and the second instruction is discarded e.g. not inserted in the queue 205.

The combined instructions may comprise load instructions for loading referenced words from the cache or main memory. In another example, the combined instructions may be store instructions for storing referenced words from the registers to the memory.

The instructions of the queue 205 may be transmitted to the data movement unit 117. Using the combined instruction, the data movement unit 117 is configured to move the words of the instructions that were combined.

Figure 3:
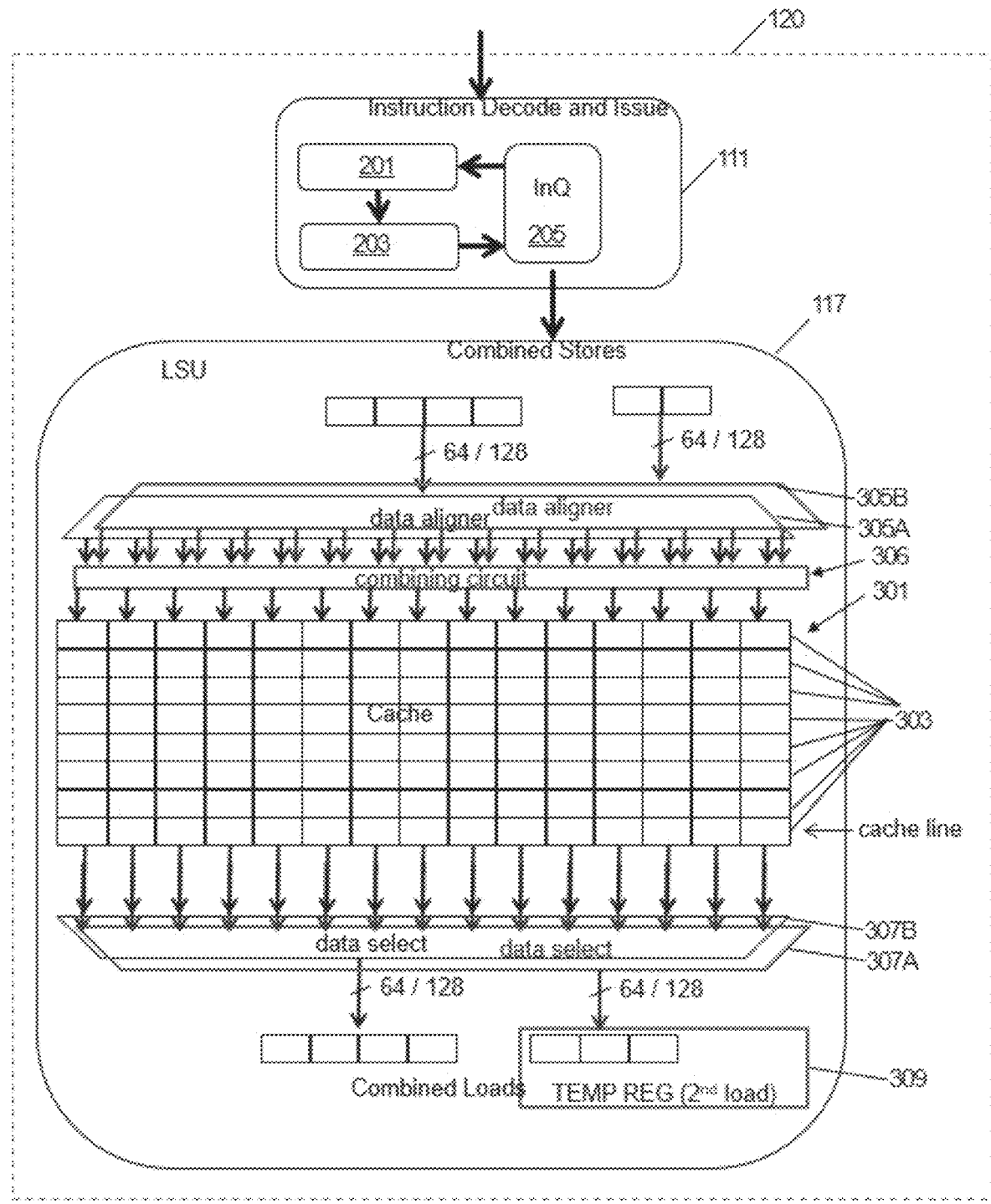
FIG. 3 is a diagram illustrating components of a processing unit in accordance with another example of the present disclosure.

FIG. 3 is a diagram of the processor unit 120 according to one illustrative embodiment. FIG. 3 also depicts a structure of the data movement unit 117 according to one illustrative embodiment.

The data movement unit 117 is shown as comprising of a cache 301. The cache 301 comprises cache lines 303. Each cache line may store words. Generally, words in the same cache line store content in consecutive memory addresses.

The cache 301 may be configured to store words and provide access to stored words. The storage of words in the cache 301 may, for example, be performed using data aligner multiplexers to store the data in the right spot within the cache line. The number of data aligner multiplexers may coincide with the number of store instructions that can be combined in a decode and dispatch unit 111. For example, if the decode and dispatch unit 111 is configured to combine two store instructions, the number of data aligner multiplexers may also be two with each associated with a respective instruction. For exemplification purposes, FIG. 3 shows two data aligner multiplexers 305A-B that may be used for executing combined store instructions. Each of the data aligner multiplexers 305A-B is configured to receive an address of a word stored in the cache 301. Based on the offset of the received address, the data aligner multiplexer 305A-B may indicate the location within the cache line on where to store the word addressed by that address. In FIG. 3, the combined instruction may transmit the two addresses of the combined store instructions to the respective data aligner multiplexers 305A-B. The output of both aligner multiplexers 305A-B are combined by a combining circuit 306 before being written to the cache. The combining circuit may, for example, be an OR gate involving an OR operation. The combining circuit may be used to combine the data of the two store instructions in case only one write port in the cache exists. New data may be stored in an empty line.

Selection multiplexers may be utilized to load words from the cache 301. The number of selection multiplexers may comprise the number of load instructions that can be combined in the decode and dispatch unit 111. For example, if the decode and dispatch unit 111 is configured to combine two load instructions, the number of selection multiplexers (also referred to as formatters) is two, with each associated with their respective instruction. For exemplification purposes, FIG. 3 shows two selection multiplexers 307A-B that may be used for executing combined load instructions. Each of the selection multiplexers 307A-B is configured to receive an address of a word loaded from the cache 301 and based on the offset of the received address. The selection multiplexer 307A-B may identify the location within the cache line where the word addressed is stored. In the example, in FIG. 3 the combined storage instruction may input the two addresses of the combined load instructions to their respective selection multiplexers 305A-B.

The data movement unit 117 may further comprise a register 309 that temporarily stores loaded words from the cache 301. For example, if the decode and dispatch unit 111 combined two load instructions (e.g. a younger received instruction with an older instruction that is part of the queue 205) with each referencing a word, the word of the younger instruction will be temporarily stored in the register 309 until it is applied at the corresponding point in the instruction stream.

Figure 4:
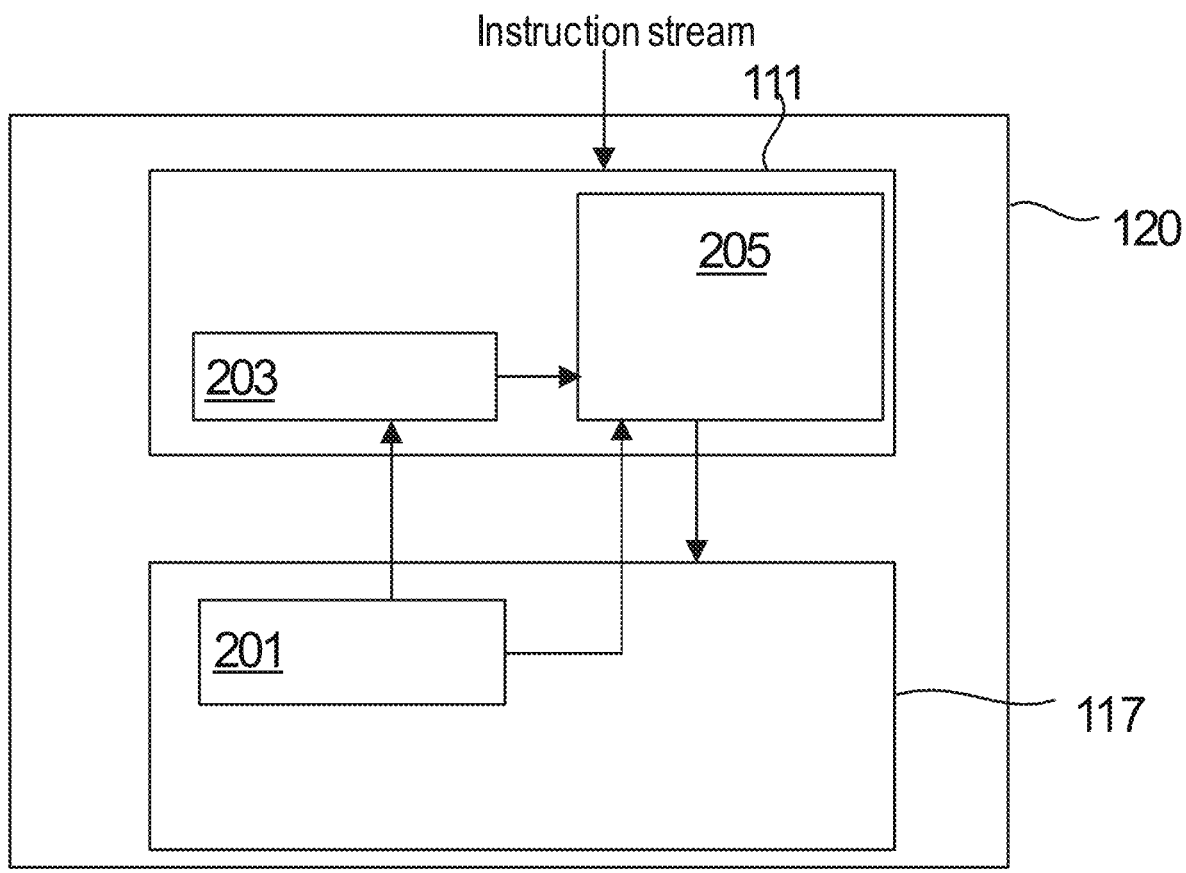
FIG. 4 is a diagram illustrating components of a processing unit in accordance with another example of the present disclosure.

FIG. 4 is a diagram of the processor unit 120 in accordance with an example of the present disclosure. The processor unit 120 is similar to the processing unit of FIG. 2, wherein the detection logic unit 201 is part of the data movement unit 117. Upon identifying that two instructions can be combined, an indication, of the identified instructions, is sent to the combination unit 203. The combination unit 203 may then combine the instructions corresponding to the identified instructions when the part of the code that involves the identified instructions is executed again (e.g. in a loop). In one example, at the time of execution, the combination unit 203 may validate that the addresses of both combinable instructions were correctly predicted (at the detection logic unit 201) as being in the same address range and/or that no intermediate dependencies were overseen.

Figure 5:
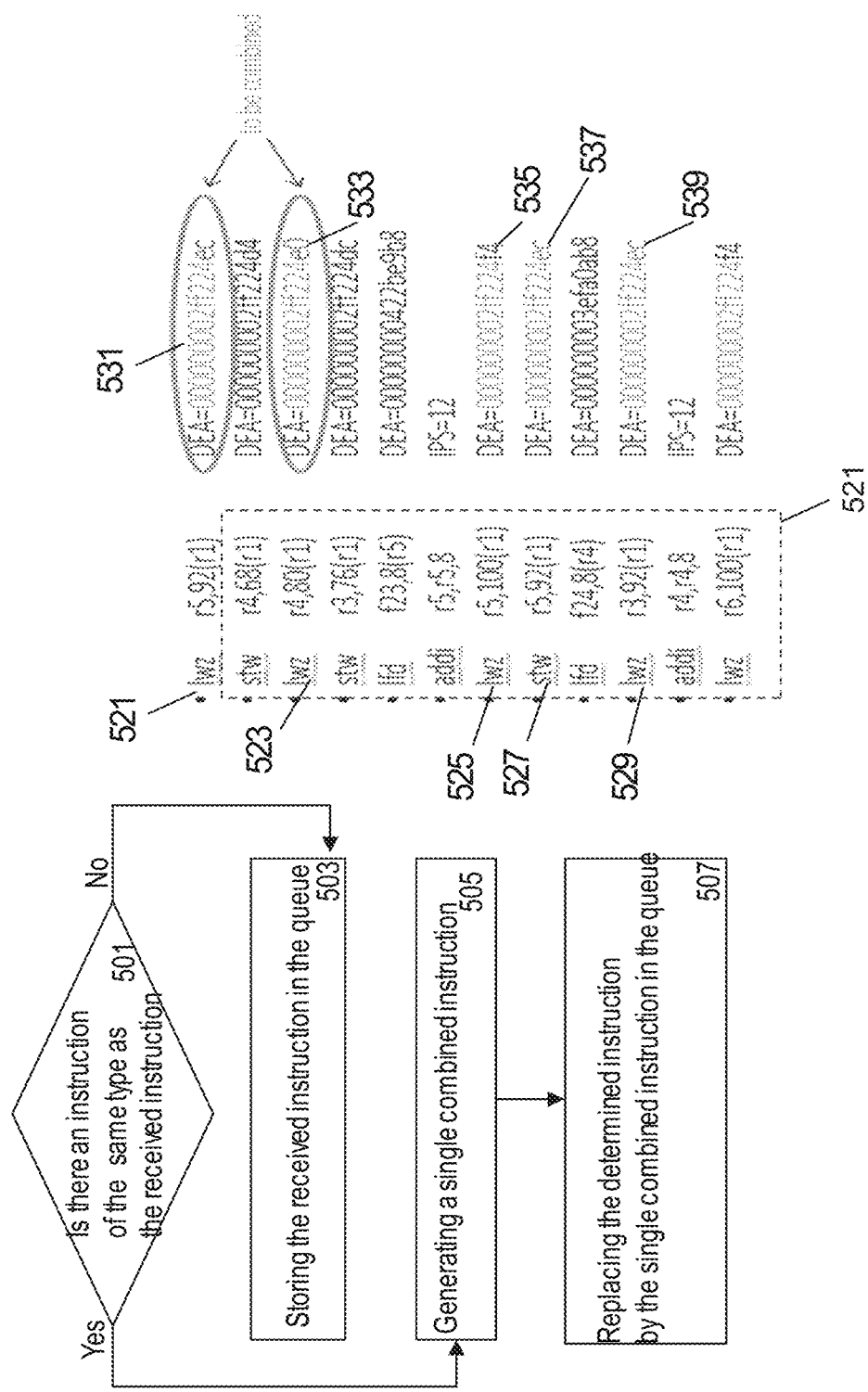
FIG. 5 is a flowchart of a method for processing data movement instructions.

FIG. 5 is a flowchart illustrating a process for processing store and/or load instructions in processor 101 in accordance with an example of the present disclosure. The decode and dispatch unit 111 is configured to receive a stream of sequential instructions and perform the following steps for each received instruction. The received instruction comprises an address or reference to a word that is to be stored or loaded. The address comprises a base register and an offset. For exemplification purposes, FIG. 5 illustrates a list of instructions, where the received instruction is instruction 521. Instruction 521 is a load instruction (lwz) that loads a word from address 531 located in the cache to a register referred to as r5. The instructions 520 may be queued instructions that are within the queue 205.

At step 501, it is determined whether the queue 205 comprises an instruction of the same type as the received instruction. In one example, there may be an instruction that reads or stores from memory. The instruction could be a load or store type instruction of a load and store unit 117. Instructions are of the same type if they reference words with addresses that have the same base register. In addition, addresses may have offsets that differ by a value smaller than a predefined maximum displacement value. For example, 92−80=12 may be smaller than 20 where 20 is the predefined maximum displacement value. The numbers 92 and 80 were used for illustration purposes to demonstrate the difference between offsets that are considered by the processor.

Upon determining that the queue 205 does not comprise a queued instruction, wherein the queued instruction references a second word and neighbors the word of the received instruction, the received instruction may be stored or queued in the queue 205. This is illustrated at step 503.

Upon determining that the queue 205 comprises a queued instruction, wherein the queued instruction references a second word and neighbors the word of the received instruction, the received instruction may not be stored in the queue 205, but rather, one combined instruction may be generated using the received instruction and the determined instruction of the queue 205. This is illustrated at step 205. Following the example in FIG. 5, an instruction 523 has an address 533. The address 533 has the same base register (r1) as the address 531 with an offset 80. The address 531 has an offset 92. The two instructions 531 and 533 are both load instructions and have the same base register r1. The differences between their respective offset is 12 which is smaller than the predefined maximum displacement value of 20. Thus, the instructions 531 and 533 may be combined.

The determined instruction 523 may then be replaced by the combined instruction in the queue 205. This is illustrated at step 507.

In one embodiment, the combined instruction is dispatched to the data movement unit 117. The data movement unit 117 is configured to generate individual main memory accesses that are executed in parallel within the cache 301. In the event of a combined instruction containing combined load instructions, the cache is able to return the individual results of the combined instructions.

Continuing with the example method in FIG. 5, the instructions 525 and 529 are identified as having the same type of instruction and are combinable. However, since a store instruction 527 references the same address 537 as the address 539 of the instruction 529, the combination may not be performed because the store instruction may update the content of the data requested using the load instruction 529.

Figure 6:
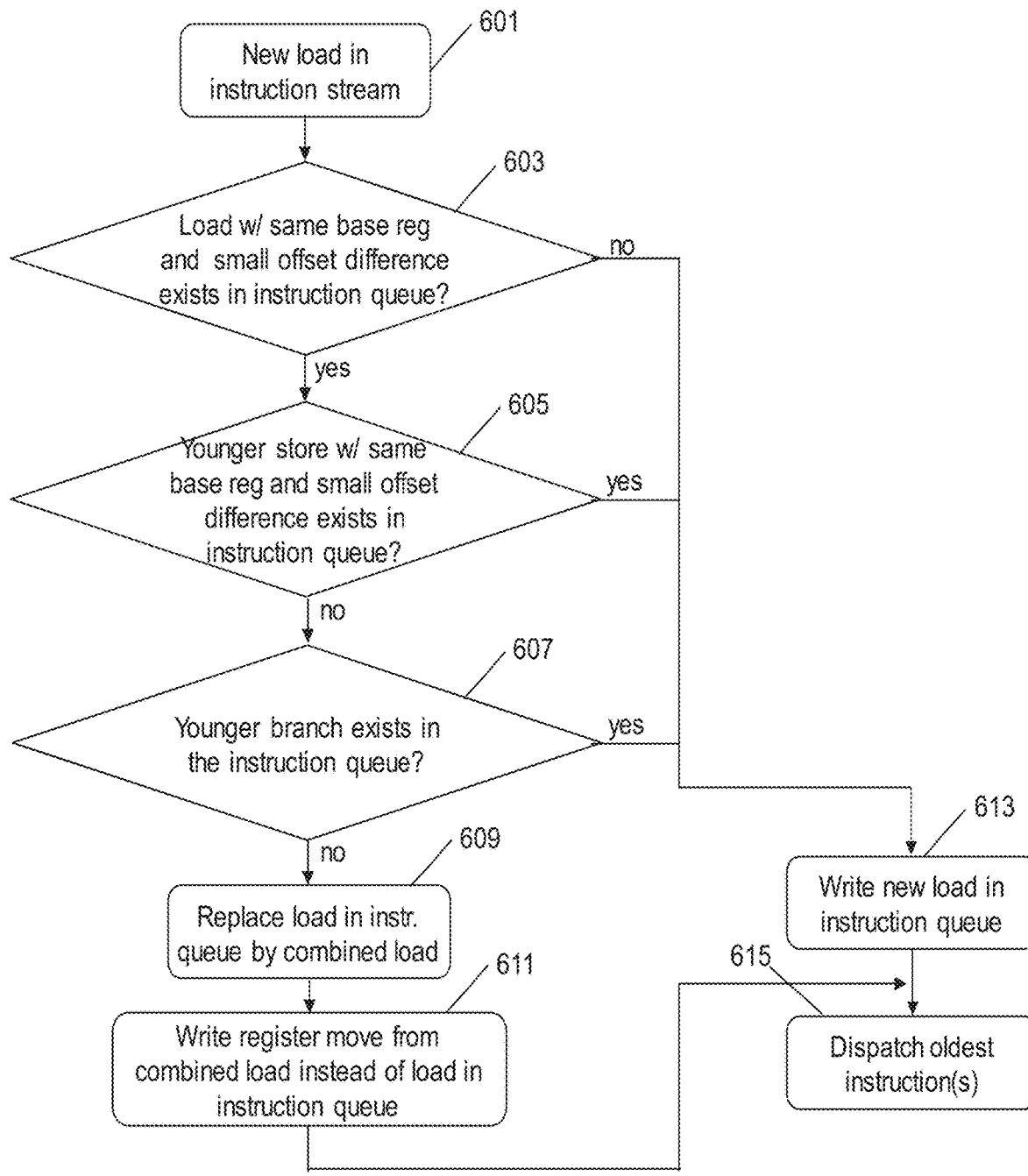
FIG. 6 is a flowchart of another method for processing data movement instructions.

FIG. 6 is a flowchart of a method for processing storage instructions such as store and/or load instructions in processor 101 according to one illustrative embodiment. At step 601, a load instruction of an instruction is received by the detection logic unit 201.

Step 603 determines if the instruction queue 205 comprises a load instruction that references an address with the same base register, and an offset difference smaller than the maximum displacement value, as the address of the received load instruction.

Upon determining that the load instruction does not reference the same base register with an offset difference smaller than the maximum displacement value at step 603, and that the load instruction is not already in the queue 205, then the received load instruction is written into the queue at step 613.

Upon determining, at step 603, that the load instruction is found to be in the queue 205, then another determination occurs. Step 605 determines whether the queue 205 comprises a younger store instruction with the same base address register as the address of the identified instruction in the queue 205 and the offset difference between offsets of the two addresses is smaller than a predefined threshold. It should be noted that the offset difference may be zero.

Upon determining that the younger store instruction is found in the queue 205, the received load instruction may be written in the queue at step 613. Otherwise, another determination occurs at step 607. Step 607 determines whether a younger branch exists in the queue 205. If the younger branch is found in the queue 205, the received load instruction is written in the queue at step 613. Otherwise, the load instruction of the queue that has been identified at step 603 is replaced by a combined instruction that combines the received load instruction and the identified instruction of the queue 205 of step 603. This is illustrated at step 609.

At step 611, a register to register move is used to provide the operand instead of using the original load instruction in the instruction queue. At step 615, the oldest instruction in the queue is dispatched.

Figure 7:
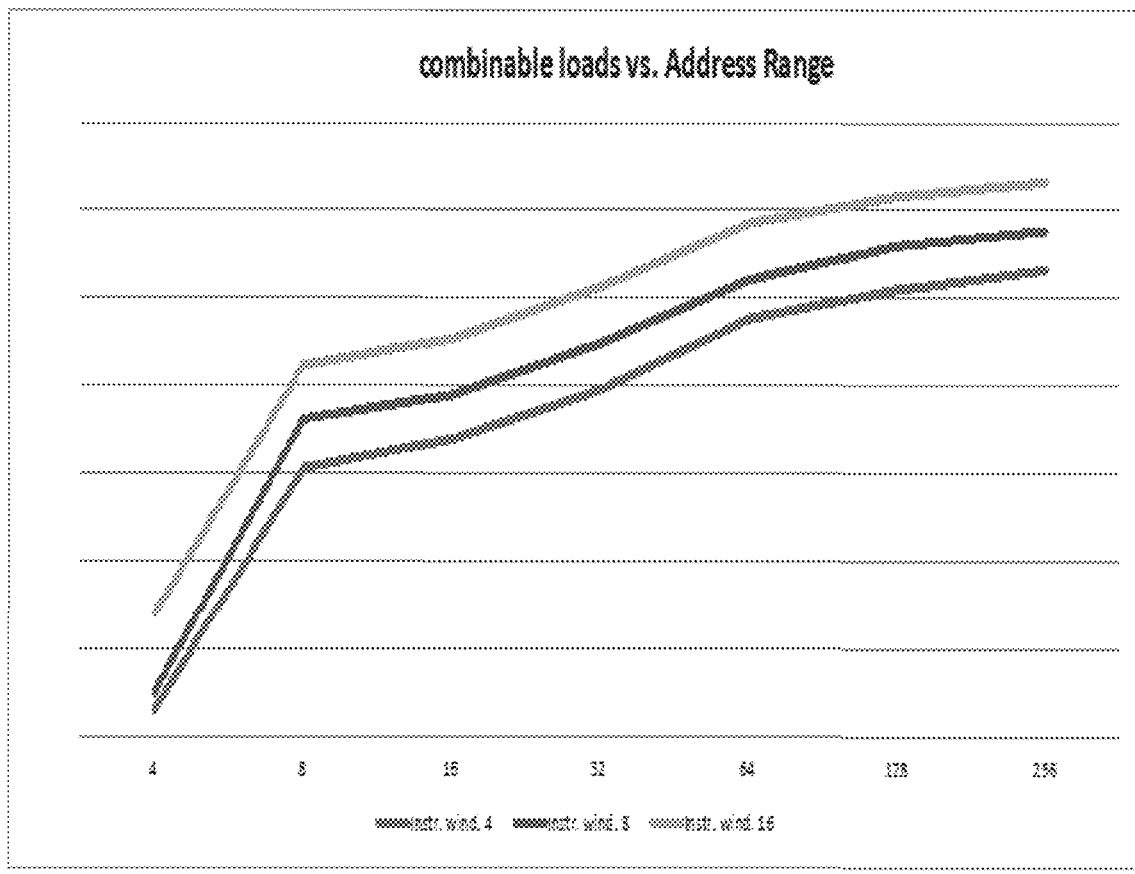
FIG. 7 is a graph indicating the fraction of combinable instructions of different sized instruction windows.

FIG. 7 is a graph illustrating a fraction (vertical axis) of combinable load instructions of different size instruction windows as a function of address ranges (horizontal axis). The address range varies from 4 to 256. For example, the ranges indicate the size of a cache line. Curve 701 indicates the fraction of combinable instructions for a window size of 16 instructions. Curve 703 indicates the fraction of combinable instructions for a window size of 8 instructions. Curve 705 indicates the fraction of combinable instructions for a window size of 4 instructions. FIG. 7 indicates that, the higher the window size, the higher the number of combinable instructions. In addition, the fraction of combinable instructions increases with the size of address range used.

In one example, a method to process instructions in a processor coupled with a main memory is provided. The processor has a memory subsystem for managing access to the main memory. The method comprises: identifying, by a detection logic unit, at least two load and/or store instructions to the main memory, wherein the store instructions having a common base register, a small immediate displacement values, and no intermediate dependencies within a fixed window of the processor instruction stream; combining the identified instructions into a one combine request within the memory subsystem of the processor; in response to a combine request, the memory subsystem generating and processing individual main memory accesses in parallel; and in case of a combined instruction containing combined load instructions, the memory subsystem returning the individual results.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
a processor unit configured to process storage instructions, wherein the processor unit comprises a detection logic unit configured to identify at least two storage instructions for moving addressable words between registers of the processor unit and neighboring storage locations, wherein the neighboring storage locations are addressed by addresses having a common base register and offsets that are separated by a predefined maximum distance;
a combination unit configured to combine the at least two storage instructions into a combined instruction; and
a data movement unit configured to move the addressable words using the combined instruction.

2. The system of claim 1, wherein the detection logic unit is configured to identify the at least two storage instructions in a predefined window of a storage instruction stream received by the detection logic unit.

3. The system of claim 2, wherein the window comprises at least four instructions.

4. The system of claim 1, further comprising an instruction queue for storing the at least two storage instructions.

5. The system of claim 1, wherein the combined instruction comprises individual instructions for each of the addressable words, wherein the data movement unit is configured to move the addressable words by processing the individual instructions in parallel.

6. The system of claim 1, wherein the at least two instructions are load instructions, wherein the data movement unit is configured to move the addressable words according to each of the at least two storage instructions in a received instruction stream.

7. The system of claim 1, wherein the addressable words are in a cache line of a cache.

8. The system of claim 1, wherein the addressable words are in a cache line of a data block of a memory.

9. The system of claim 1, wherein the storage instructions are load instructions, wherein none of the neighboring storage locations is referenced by a store instruction that is received between the at least two storage instructions in a received instruction stream.

10. The system of claim 1, further comprising a cache configured to store words in cache lines, wherein the cache comprises a store multiplexer configured to enable a storage of words to one or more cache lines of the combined instruction.

11. The system of claim 1, further comprising a cache configured to store words in cache lines, wherein the cache comprises a data selection multiplexer configured to enable a read of words from one or more cache lines of the combined instruction.

12. The system of claim 1, wherein the data movement unit is a load and store unit, wherein the detection logic unit and the combination unit are part of an instruction decode unit.

13. The system of claim 1, wherein the detection logic unit and the data movement unit are part of a load and store unit, and the combination unit is part of an instruction decode unit.

14. A method for processing a storage instruction of a received instruction referencing a word, the method comprising:
loading an instruction queue received by a detection logic unit;
determining whether a load instruction within the instruction queue references an address within a same base address register as a received load instruction, wherein an offset difference between the load instruction and the received load instruction is smaller than a maximum displacement value;
upon determining that a load instruction within the instruction queue references an address within a same base address register as the received load instruction, determining whether the instruction queue lacks a younger store instruction with the same base address register as the load instruction;
upon determining that the instruction queue lacks a younger store instruction with the same base address register as the load instruction determining whether a younger branch exists in the instruction queue; and
upon determining that a younger branch does not exist in the instruction queue, replacing the load instruction with a combined instruction that combines the load instruction with the received load instruction.

15. The method of claim 14, wherein the detection logic unit is configured to identify at least two storage instructions in a predefined window of a storage instruction stream received by the detection logic unit.

16. The method of claim 15, wherein the window comprises at least four instructions.

17. The method of claim 14, wherein the combined instruction comprises individual instructions for each addressable word, wherein a data movement unit is configured to move the addressable words by processing the individual instructions in parallel.

18. The method of claim 14, wherein the load instruction is for moving an addressable word between registers of a processor unit, wherein the addressable word is in a cache line of a cache.

19. The method of claim 14, wherein the load instruction is for moving an addressable word between registers of a processor unit, wherein the addressable word is in a cache line of a data block of memory.

* * * * *